Jan. 31, 1928. 1,657,719

C. S. JOHNSTON

DEMOUNTABLE RIM FOR VEHICLE WHEELS

Original Filed Dec. 16, 1925  2 Sheets-Sheet 1

INVENTOR
CLARENCE S. JOHNSTON
BY
George F. Ballay
ATTORNEY

Jan. 31, 1928.
C. S. JOHNSTON
1,657,719
DEMOUNTABLE RIM FOR VEHICLE WHEELS
Original Filed Dec. 16, 1925  2 Sheets-Sheet 2
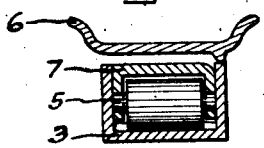
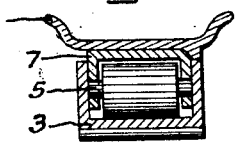
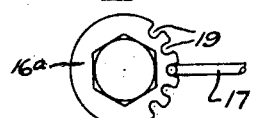
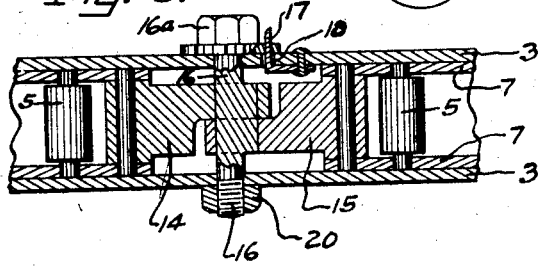
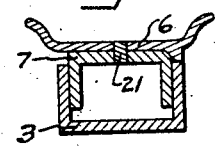
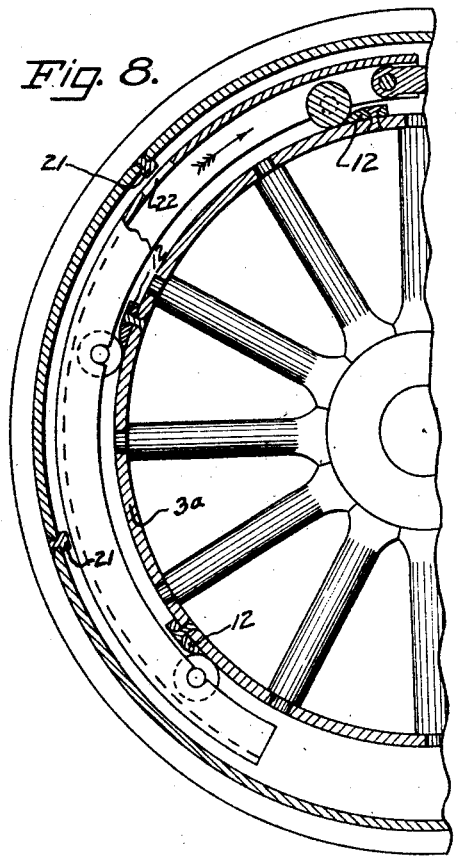
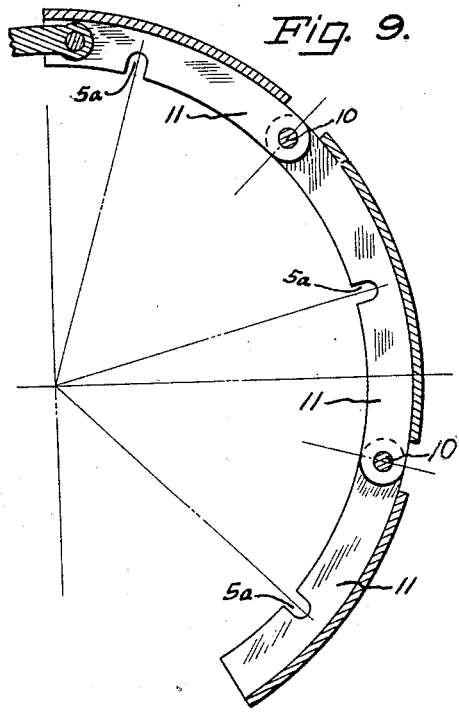
INVENTOR
CLARENCE S. JOHNSTON
BY
George F. Bailey
ATTORNEY Patented Jan. 31, 1928.

1,657,719

UNITED STATES PATENT OFFICE.

CLARENCE S. JOHNSTON, OF OAKLAND, CALIFORNIA.

DEMOUNTABLE RIM FOR VEHICLE WHEELS.

Application filed December 16, 1925, Serial No. 75,761. Renewed June 28, 1927.

This invention relates to vehicle-wheels.

The invention more particularly relates to demountable tire-carrying rims that may be secured to and removed from standard vehicle-wheels for the purpose of rapidly changing the tire to eliminate excessive labor and time required for doing same.

An object of the present invention is to improve the construction of demountable rims for vehicle-wheels and to provide said rim with means for radially supporting same to the felloe band of the wheel.

In other words, it is an object of the invention to provide for a demountable rim an improved felloe band and to introduce a new and novel mechanism for rigidly supporting and locking said demountable rim to said felloe band.

A further object of the invention is to provide a demountable rim that can be easily mounted on old wheels and thus eliminate the necessity of procuring a complete new wheel when it is desired to obtain a demountable rim.

The invention possesses other objects and features of advantage, some of which, with the foregoing, will be made manifest in the following description of the preferred form of the invention which is illustrated in the drawings accompanying and forming part of the specification.

It is to be understood that it is not intended to limit the invention to the embodiment shown by said drawings and descriptions as variations may be adopted within the scope of the invention as set forth in the claims.

In the accompanying drawings,—

Figure 3 is an end sectional view through line A—A of Figure 1 looking in direction of the arrows, showing a roller and supporting arc in their lower and removable positions.

Figure 4 is an end sectional view on line B—B of Fig. 2 looking in direction of the arrows, showing a roller and supporting arc in their uppermost position radially supporting the demountable rim.

Figure 5 is a sectional view on lines C—D—E—F—G of Figure 1, showing a preferred type of mechanism used in the invention to move the arcs circumferentially to their respective positions.

Figure 6 is a top plan view of a preferred type of eccentric and locking bolt used in the invention.

Figure 7 is an end sectional view through line H—H of Fig. 2 showing the supporting-arc in its upper position keyed in the demountable rim.

Figure 8 is a longitudinal sectional view of a portion of a wheel involving the invention showing raised portions secured to the felloe band of the wheel for lifting the rollers and arcs.

Figure 9 is a longitudinal sectional view of a series of supporting-arcs pivotably connected to each other, thereby forming separate independent sections of support.

The improvements may be embodied on any type of vehicle-wheel, which obviously, may be built up in any suitable manner, the present illustration not being utilized as indicating the only form of wheel onto which the parts may be mounted.

Figure 1:
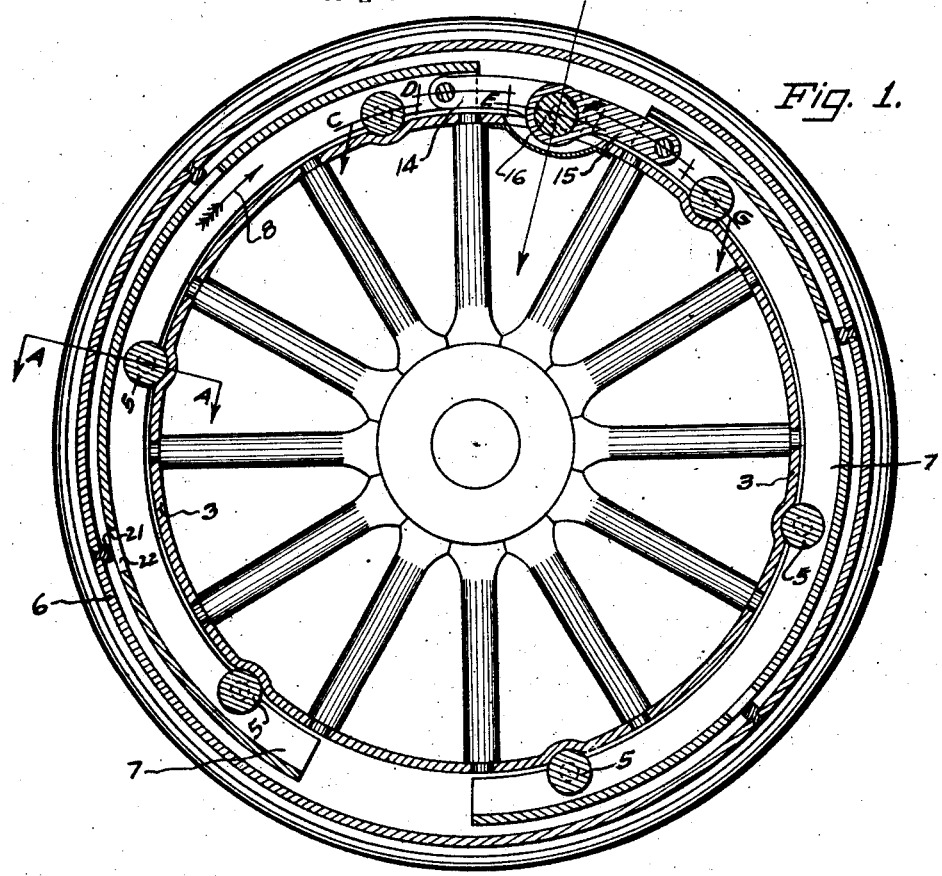
Figure 1 is a longitudinal sectional view of a wheel involving the invention showing the demountable rim in position to be removed.
Figure 2:
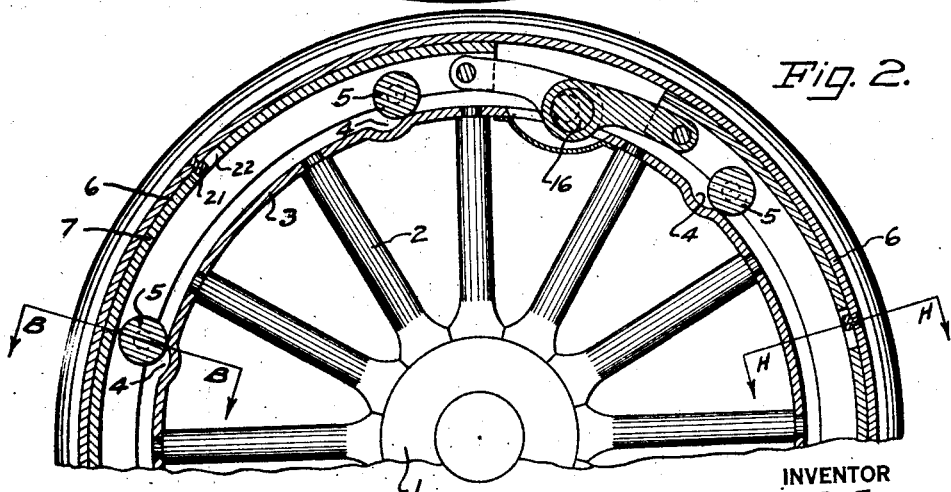
Figure 2 is a longitudinal sectional view of a portion of a wheel involving the invention showing the demountable rim in locked position.

According to the construction shown the numeral 3 designates the felloe band of one type of vehicle-wheel, and in the illustration of Figures 1 and 2 is provided with a plural number of horizontal depressions or grooves 4 to allow space for a plural number of slidable or rolling members 5 that are adapted to be circumferentially moved on the felloe band 3, the object of the movement of which will be hereinafter described.

The numeral 6 designates a demountable rim and may be of any size or shape and provided with any necessary means to properly hold a pneumatic tire. As hereinbefore stated, one of the objects of the invention is to provide means for properly supporting the demountable rim to the fixed rim or felloe band of the wheel. A preferred type of such means is shown as comprising a plural number of arc shaped supporting members 7 into which are pivotably mounted a plural number of rollers 5 in such a manner as to enable them to fit in their depressions or grooves 4 and to be movable out of said grooves and along the outer periphery of the felloe band 3. It will thus be observed that as the arcs 7 are moved in the direction as shown by the arrow 8 Figure 1, the rollers will move out of their respective grooves 4 and take the position along the outer periphery of the felloe band as shown in Figure 2 forcing the arcs against the inner periphery of the demountable rim 6, making a positive continuous tight contact against said inner periphery and also continuously radially supporting the demountable rim 6 to the felloe band 3 making a substantial solid unit with the wheel when the various parts are locked in position.

It is to be understood that the arcs may be of any radius or shape and made of any material to best serve the object of the invention. In Figure 1 only two arcs are shown, it being further understood that the material of which they are composed is of such resiliency so as to enable them to expand or contract into the necessary shape when they are in their upper or lower positions.

In Figure 9 is shown a series of arcs 11 pivotally connected to each other and especially adapted to be used when it is desired to apply the invention to wheels of the larger sizes, thus providing a rim supporting arc that may be made of extremely heavy material. In this type of arc, the outer radius is preferably the same as the inner radius of the demountable rim and supported in the same manner as illustrated in Figures 1 and 2.

An important feature of the invention is the construction of the parts so as to enable them to be mounted on old wheels, thereby making it unnecessary to procure a complete new wheel in order to obtain a demountable rim. In Figure 8 the numeral 3$^a$ designates the felloe band of an old vehicle wheel. The numeral 12 designates a piece of metal fastened to said felloe band 3$^a$ to provide a raised surface onto which the rollers are moved in the same manner as illustrated in Figures 1 and 2. By this construction it is a simple matter to mount and lock the demountable rim on old vehicle-wheels of standard make.

Having described the various rim supporting arcs and their relative members, it is a further object of the invention to provide improved means for circumferentially moving, and locking same. A preferred type of such means is illustrated in Figures 1, 2 and 5, and consists in providing a pair of arms 14 and 15, each arm of which is pivotably connected to a different arc, or a different series of arcs, and then pivotably connected together by means of an eccentric acting bolt 16 as shown in Figure 5. Said bolt has bearing in the side walls of the felloe 3 and it is to be noted that the center of this portion of the bolt is different than the center of the portion that has bearing in the arms 14 and 15. It will thus be observed that as the bolt 16 is rotated in one direction or the other by applying a wrench or tool to the bolt head 16$^a$, the eccentric portion of the bolt will act upon the arms 14 and 15 and cause them to move the rim supporting arcs in one direction or the other. When it is desired to move the arcs in their supporting position, the bolt is moved in direction shown by the arrow 8 until the arcs have reached their limit of travel, and is then securely locked. When it is desired to release the supports and remove the rim, the bolt is moved in the opposite direction, the action of which positively lowers the supports and enables the rim to be easily demounted.

Any suitable means may be used for locking the bolt, the present construction being shown as comprising a pin 17 made of resilient material and fastened to the side wall of the felloe 3, projecting through a slot 18 in said wall, and adapted to fit in one of the notches 19 in bolt-head 16$^a$ when said bolt has moved the arcs to their uppermost and supporting position. As hereinbefore mentioned, the pin 17 is composed of resilient material, and is located at such a distance from the outermost face of the bolt-head 16$^a$, that when a socket wrench is applied to said bolt-head, the outer edge of the metal forming the socket fits between the outermost edge of said bolt-head and pin, spreading the pin out of the respective notches 19, thus enabling the bolt to be rotatable. A nut 20 is provided for bolt 16, and is locked thereon, thereby making the bolt rigidly secured to the wall of felloe 3.

The fixed rim and the arcs are shown in the present illustration as being made of channel shaped material, but the shape may be changed in many ways and modified in different forms. A plural number of keys 21 are secured on the demountable rim 6 which are adapted to fit in keyways 22 provided in the arcs 7 and rigidly key said rim and arcs together when they are in their locked position.

Having thus illustrated and described a certain form of construction pertaining to the principle of the invention, it is desired to include in this application for Letters Patent all that comes within the range of the invention as set forth in the claims hereinafter mentioned.

What is claimed is:

1. The combination with a wheel and a demountable rim mounted upon the wheel felloe, of a plural number of arc-shaped members located between the demountable rim and the felloe, a plural number of rollers mounted in the arc-shaped members and adapted to have bearing on the wheel felloe, the said wheel felloe being provided with means which when the rollers are circumferentially moved thereupon in one direction forces and supports the arc-shaped members against the demountable rim and if then circumferentially moved in the opposite direction releases said members from the demountable rim, means for circumferentially moving said members, means for locking the parts in position and means for releasing same.

2. The combination with a wheel and a demountable rim mounted upon the wheel felloe, of a plural number of arc-shaped members located between the demountable rim and the felloe, a plural number of rollers pivotally mounted on the arc-shaped members and adapted to have bearing on the wheel felloe, the said wheel felloe being provided with an irregular surface which when the rollers are circumferentially moved thereupon in one direction forces and supports the arc-shaped members against the demountable rim and if then moved in the opposite direction releases said arc-shaped members from said demountable rim, means for circumferentially moving said members, means for locking the parts in position and means for releasing same.

3. The combination with a wheel and a demountable rim mounted upon the wheel felloe, of a plural number of semicircular channel shaped members located between the demountable rim and the felloe, a plural number of rollers pivotally mounted in said members and adapted to have bearing on the felloe, the said wheel felloe being provided with an irregular surface on the outer periphery thereof which when the rollers are circumferentially moved thereupon in one direction forces and supports the semicircular channel shaped members against the demountable rim and if then moved in the opposite direction releases said members from said demountable rim, means for circumferentially moving said members, the said means comprising an eccentric operable on the wheel felloe and pivotally mounted to said members, means for locking the parts in position and means for releasing same.

In testimony that I claim the foregoing I have hereto set my hand this 7th day of December, 1925.

CLARENCE S. JOHNSTON.